Oct. 10, 1939.  F. SCHABER  2,175,650
DEPTH GAUGE
Filed July 12, 1937
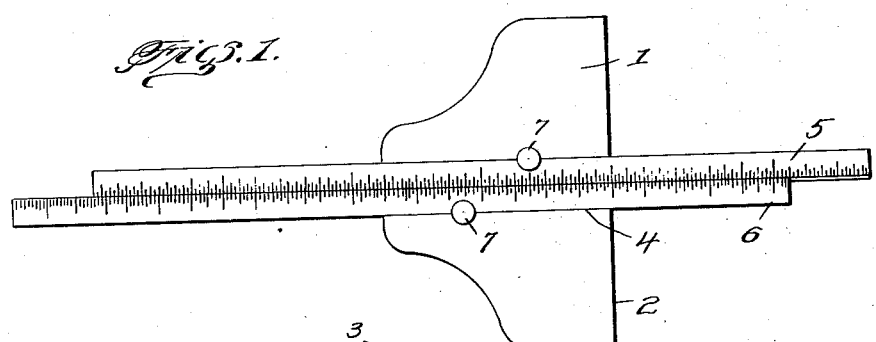
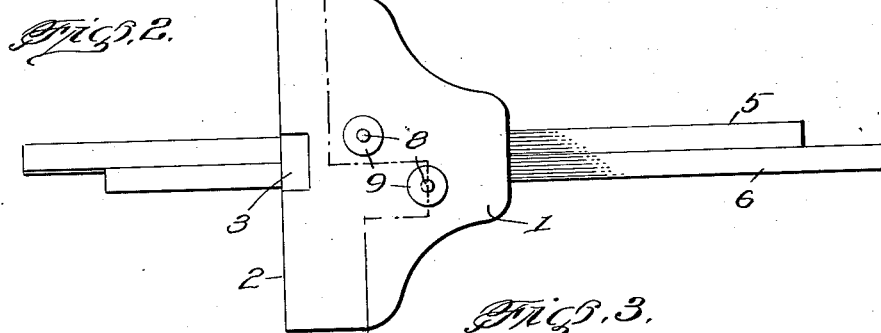
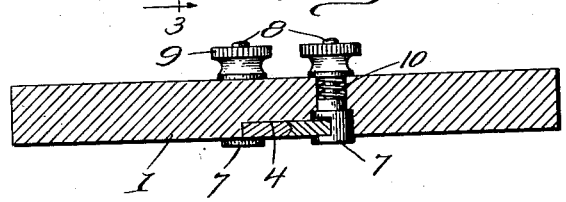
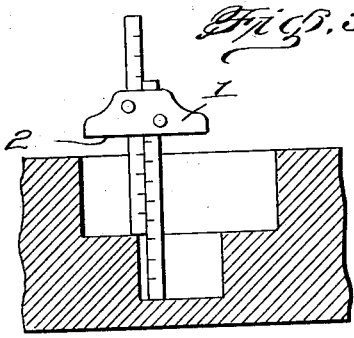
Fred Schaber
INVENTOR
BY Victor J. Evans & Co.
ATTORNEYS Patented Oct. 10, 1939

2,175,650

UNITED STATES PATENT OFFICE 2,175,650

DEPTH GAUGE

Fred Schaber, Detroit, Mich.

Application July 12, 1937, Serial No. 153,267

1 Claim. (Cl. 33—169)

This invention relates to depth gauges and has for the primary object the provision of a device of this character which will permit accurate measuring of depth of sockets and the like wherein variable diameters of a socket are present and employs in its construction a pair of graduated depth measuring elements readily adjustable endwise to each other and both slidable on a head and which may be held releasably secured against sliding movement relative to each other and to the head.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a bottom plan view illustrating a depth gauge constructed in accordance with my invention.

Figure 2 is a top plan view illustrating the same.

Figure 3 is a sectional view taken on the line 3—3 of Figure 2.

Figure 4 is a detail sectional view illustrating the interfitting connection between the pair of measuring elements.

Figure 5 is a front elevation, partly in section, showing the device positioned in a socket for measuring the latter.

Referring in detail to the drawing, the numeral 1 indicates a substantially flat elongated head having a straight longitudinal edge 2 centrally provided with a beveled sight recess 3 extending into one face of the head, while its opposite face is provided with a channel 4 extending along the transverse center thereof, and paralleling the sight recess. Slidably mounted in the channel is a pair of depth measuring elements 5 and 6, each provided with suitable graduations. One longitudinal edge of one of the elements has a V-shaped groove and the corresponding edge of the other element is shaped to match said groove thereby slidably connecting the elements and acting to aid in preventing lateral displacement of the elements relative to each other.

Grooved securing members 7, one for each measuring element, are journaled in the head and receive therein the measuring elements. The members 7 may have a limited sliding movement in the head 1 and include screw threaded shanks 8 on which nuts 9 are threaded. The nuts 9 bear on the head 1. Springs 10 of the coil type are interposed between the nuts and the members 7. By adjusting the members 7 endwise in opposite directions will bring about securing and releasing of the measuring elements in the head 1. The members 7 when adjusted endwise in one direction bind the measuring elements against the head 1 to prevent said measuring elements from sliding relative to each other and the head and when adjusted endwise in an opposite direction said measuring elements are free so that they may be adjusted endwise of each other and relative to the head.

The measuring elements are held against separation by the head 1 and the interfitting connection between said elements. In use, the depth of a socket or recess may be gauged or measured, as shown in Figure 5. This measurement can be made with accuracy regardless whether the member in which the socket is formed is unfinished on its outer face due to the fact that it is not necessary for the head 1 to be brought into engagement with the socketed member in order to make a correct measurement.

What is claimed is:

A depth gauge comprising a flat substantially elongated head having a channel extending along the transverse center of one face thereof, said head having a straight edge disposed longitudinally thereof and a beveled recess paralleling the channel and extending from the straight edge into the opposite face of the head, a pair of measuring elements fitting and slidably mounted within the channel and being interfittingly associated together in edge to edge relation for independent endwise sliding movement relative to each other, said head having a pair of openings extending therethrough one upon each side of the channel, securing members, one for each measuring element, and seated in the openings, the securing members including grooved means with the measuring elements mounted in the grooves thereof and spring pressed screw means for releasably holding the measuring elements against movement.

FRED SCHABER.